(12) United States Patent
Conte et al.

(10) Patent No.: US 7,831,468 B1
(45) Date of Patent: Nov. 9, 2010

(54) SYSTEM FOR CUSTOMIZING BENEFITS FOR FINANCIAL CUSTOMERS

(76) Inventors: Robert V. Conte, 6 Linden Dr., Purchase, NY (US) 10577; Gerard A. Garofolo, 6 Old Village La., Katonah, NY (US) 10536

( * ) Notice: Subject to any disclaimer, the term of this patent is extended or adjusted under 35 U.S.C. 154(b) by 1281 days.

(21) Appl. No.: 10/386,201

(22) Filed: Mar. 10, 2003

Related U.S. Application Data

(63) Continuation of application No. 10/305,996, filed on Nov. 26, 2002, now abandoned.

(60) Provisional application No. 60/333,929, filed on Nov. 28, 2001.

(51) Int. Cl.
*G06Q 30/00* (2006.01)
(52) U.S. Cl. .................... 705/14.1; 705/14.17
(58) Field of Classification Search .................... 705/14, 705/38, 10, 26, 76, 68, 75, 35, 39, 27, 14.1
See application file for complete search history.

(56) References Cited

U.S. PATENT DOCUMENTS

| | | | | |
|---|---|---|---|---|
| 5,537,314 A | * | 7/1996 | Kanter | 705/14 |
| 5,644,723 A | * | 7/1997 | Deaton et al. | 705/14 |
| 6,014,645 A | * | 1/2000 | Cunningham | 705/38 |
| 6,362,840 B1 | * | 3/2002 | Burg et al. | 345/835 |
| 6,374,230 B1 | * | 4/2002 | Walker et al. | 705/35 |
| 6,658,419 B2 | * | 12/2003 | Pasquali | 707/10 |
| 7,308,426 B1 | * | 12/2007 | Pitroda | 705/35 |

FOREIGN PATENT DOCUMENTS

WO    WO 94/29793    * 12/1994

* cited by examiner

*Primary Examiner*—Daniel Lastra
(74) *Attorney, Agent, or Firm*—Gerald E Hespos; Michael J Porco; Thomas P. Dowd

(57) ABSTRACT

A system for customizing benefits to be made available from benefit providers to financial account holders through their account providers, wherein a promotional enterprise gathers and segments appropriate information in a central server system for use by participant groups, including financial account holders, their account providers, benefit providers, and credit bureaus. Appropriate information is gathered on account holders, with permission, regarding their marketing practices and cross-selling and up-selling mechanisms using their purchasing patterns and behavior. This information is stored in the server system for use in offering account holders enhanced benefit selections in accordance with specific rules that generate free upgrades, fee-based offers, and other cross-sell/up-sell promotions based on the account holders' interests, and which afford product profit opportunity and other pre-determined factors to the participant groups. A knowledge base of account holders is provided tied in directly to both automated and live on-line account holder services and can afford management tools for reporting, measuring, and evaluating suggestions to an account holder's complete portfolio.

29 Claims, 6 Drawing Sheets

SYSTEM FOR CUSTOMIZING BENEFITS FOR FINANCIAL CUSTOMERS

This application is a continuation of U.S. patent application Ser. No. 10/305,996 filed Nov. 26, 2002, now abandoned, and this application also claims the benefit of the filing date of U.S. Provisional Patent Application No. 60/333,929 filed Nov. 28, 2001.

BACKGROUND OF THE INVENTION

1. Field of the Invention

The present invention relates to the promotion and customization of benefits offered and provided to financial service industry customers, such as the users of payment transaction systems and methods, e.g., credit/charge card holders, and more particularly to a system and method for interacting with such customers and gathering information with their permission to tailor the marketing of products and the offering of benefits to them.

2. Description of the Related Art

Consumers today are widely solicited by various entities in the financial services industry, such as banks, credit card associations, and other financial institutions, as well as by such commercial entities as department stores and like merchants, to open accounts which facilitate payment for transactions conducted between a consumer and the entity. These entities, hereinafter referred to as Sponsor/Account Providers, typically offer accounts that have personal payment vehicles, such as cards, associated with them that are issued to individuals, hereinafter referred to generally as Customer/Account Holders, for use at the point of sale of an article or service by being presented to effect payment. As a result, an individual consumer can accumulate a number of personal cards and will normally use a variety of them when shopping at different stores, or when shopping by telephone or Internet, or for transactions at ATMs. To compete for preference over other payment providers, some Sponsor/Account Providers offer products and services that provide special benefits to their Customer/Account Holders in the form of premiums, insurance, or discounts on products. These promotional programs vary in the benefits offered and in the manner and to which Customer/Account Holders, they are offered. Typically benefits are provided to all of the Customer/Account Holders of a Sponsor/Account Provider whether the Customer/Account Holders are aware of or are interested in the benefit or not, so that, for the most part, the benefits are not well tailored to the needs and desires of the large number of Customer/Account Holders that are effected. Even when some targeting has been attempted, most marketers of payment products, i.e., most Sponsor/Account Providers, are still not aware of the preferences or stated interests of individual Customer/Account Holders because Sponsor/Account Providers primarily rely on data based on behavioral purchase patterns to determine interest in specific benefits as opposed to relying upon specific Customer/Account Holder stated interests and needs. While using behavioral data is an effective method to target Customer/Account Holders for future promotions, it is an altogether limiting method for helping Sponsor/Account Providers determine benefits appropriate to an individual Customer/Account Holder. Beyond Sponsor/Account Providers, other enterprises such as fulfillment centers (Fulfillment Centers), providers of benefits (Benefit Providers), credit recording, checking, and approving bureaus (Credit Bureaus), and organizations related to the approval of, transactions with, and promotions to payment vehicle users currently act largely independently using their proprietary systems so that often manual processes are needed to interact with each other. Consequently, current Customer/Account Holder benefit promotions can constitute an expense for the Sponsor/Account Provider that does not always provide a worthwhile return.

Accordingly, many special promotions and benefits can constitute a considerable expense to the Sponsor/Account Providers of payment vehicles (e.g., credit cards) while failing to efficiently provide benefits to their Customer/Account Holders. Thus, existing benefits systems tend to be inefficient and do not optimally serve either the Sponsor/Account Providers or their Customer/Account Holders.

The solution to the problem of efficiently providing benefits to financial service industry Customer/Account Holders or alternative payment users in accordance with the present invention involves the provision of a System and Method by which financial services companies, e.g., Sponsor/Account Providers, Credit Bureaus, Benefit Providers, and Fulfillment Centers interact with their payment device end users, i.e., Customer/Account Holders, and gather information with permission to enable the providers to efficiently tailor promotional programs to the appropriate Customer/Account Holder base.

It is an object of the present invention to provide a System and Method by which members of the financial services industry, such as banks, payment card associations, and other financial institutions, as well as department stores and other merchants, Sponsor/Account Providers, Credit Bureaus, Fulfillment Centers, and Benefit Providers, can efficiently offer promotional programs to their Customer/Account Holders that use alternative payment vehicles such as charge, credit, debit, chip (smart), and stored value cards, as well as checking, online and any other transaction accounts, and effectively interact with all enterprises related to these processes.

It is another object of the present invention to provide such a System and Method that is capable of being tailored to the needs and desires of the Customer/Account Holders through the gathering, with their permission, of appropriate information for this purpose.

It is a further object of the invention to provide a System and Method by which Sponsor/Account Providers, marketers, transaction processors, and Credit Bureaus can facilitate and efficiently carry out promotional programs, and by which these same groups can more easily and efficiently interact with one another and the Customer/Account Holder to provide such benefits.

It is an additional object of the invention to provide diverse and multiple media channels, e.g., a web site, or a Customer/Account Holder service call center, for the use of a Customer/Account Holder and for the Sponsor/Account Provider to allow the end user (Customer/Account Holder) to select the method of communication most beneficial to that consumer.

It is also an object of the invention to provide Sponsor/Account Providers with relevant, vital, and usable data whereby the Sponsor/Account Provider can conduct analysis and measurement and in turn develop marketing campaigns tailored to offer promotions or benefits in a one-to-one relationship with the Customer/Account Holder.

It is also an object of the invention to supply Benefit Providers and Sponsor/Account Providers with a tool that makes available vital information necessary for such Providers to conduct operational and strategic business planning as well as to provide support and information necessary for managing current product development and creating new product development initiatives.

It is also an object of the invention to provide Benefit Providers with relevant, vital and usable data whereby the Benefit Providers can more efficiently manage product and service inventories, can conduct analysis and measurement and, in turn, can promote new products and services to Sponsor/Account Providers quickly and efficiently.

It is also an object of the invention to provide the users of the System with a more intuitive and simpler user interface that enables the user to conduct nearly all transactional and decision-making processes within one screen, or more effectively, in fewer screens than are currently used in today's web-enabled interactions.

It is also an object of the invention to provide the Sponsor/Account Providers that use the System with a template design format that enables a Sponsor/Account Provider to customize the presentation to Customer/Account Holders so as to private-label, or privatize with its own company brand, the presentation on the actual system providing the Customer/Account Holder with a sense that the System is owned and operated by the Sponsor/Account Provider.

It is also an object of the invention to provide Sponsor/Account Providers with a means to directly, immediately and in a paperless manner provide Customer/Account Holders with product and service terms, conditions and warranties.

SUMMARY OF THE INVENTION

The present invention is directed to achieving the improved promotion and customized delivery of benefits to Customer/Account Holders by the financial services industry and other commercial entities that issue payment transaction vehicles such as consumer credit cards, debit and charge instruments, stored value products, chip/smart products and the like, and more particularly, to a system and method for interacting with existing financial account holders and gathering appropriate information on them, with their permission and assistance if needed, to enable the tailored marketing of products and the selective offering of benefits to such Customer/Account Holders. A System in accordance with the invention may be formed or assembled by a promotional enterprise, hereinafter Promoter/System, that gathers and segments appropriate information in a central server, or server system on a network, for use by a number of System participants, e.g., four distinct participant groups including a Customer/Account Holders, Sponsor/Account Providers, Benefit Providers, and Credit Bureaus. The Promoter/System functions to bring together the participant groups and facilitates their related interactions by making available the server(s) and software that store and handle access to the appropriate information so that participants, by means of their inputs and outputs, can exchange and obtain benefits for each from the overall System, which System will be referred to as the BenefitSystem. The BenefitSystem enables Customer/Account Holders to choose the benefits they receive and Sponsor/Account Providers to promote products based upon Customer/Account Holder interest, need, and financial status, as well as profit potential and brand considerations of the Sponsor/Account Providers. Appropriate information is gathered with a Customer/Account Holder's permission, and assistance if necessary, regarding the marketing practices and cross-selling and up-selling mechanisms practiced by the Customer/Account Holder using purchasing pattern and behavior. This information is stored in the BenefitSystem server or network and, using this information, enhancement selections may then be provided for the Customer/Account Holder or product offerings in accordance with specific rules that generate free upgrades, fee-based offers, and other cross-sell/up-sell promotions dependent upon the Customer/Account Holder's interests, and which afford product profit opportunity and other pre-determined factors to the participant groups. Accordingly, the BenefitSystem can provide a knowledge base of Customer/Account Holders tied in directly to both automated and live on-line Customer/Account Holder services and can afford management tools for reporting, measuring, and evaluating suggestions to a Customer/Account Holder's complete portfolio.

Further, with the System and Method of the invention, Sponsor/Account Providers can control the information and promotional content provided to a Customer/Account Holder creating for the Customer/Account Holder a unique exchange between the account Sponsor/Account Provider and the Customer/Account Holder. Also, the BenefitSystem can be used to provide data exchange for a variety of enterprises and as a mechanism for Customer/Account Holders to readily change or modify personal contact information, such as a street address, so as to provide a transaction account Sponsor/Account Provider with a robust and accurate database of Customer/Account Holder information. Customer/Account Holders can select specific interests and from these selections expect to receive information, e.g., product offers, no-cost benefits, or upgrades, tailored to their interests. Interested Sponsor/Account Providers, and in particular their marketing departments, can use the System as a marketing automation tool designed to create, measure, and refine marketing campaigns. In addition, commercial organizations can use the information generated from the BenefitSystem for operational and strategic business planning as well as for creating product development strategies on current and future products.

Additional promotional and marketing considerations that can be achieved using interactions with the BenefitSystem, include the capabilities of:

providing incentive points that generate free upgrades, fee-based offers and other promotions;

enabling various levels of Customer/Account Holder service dependent upon the Customer/Account Holder and his value to the Sponsor/Account Provider;

enabling rapid user data cleansing;

integrating different Customer/Account Holder channels including the Internet, e-mail, text chat instant messaging, shared browsing, and voice-over IP, thereby providing transparent movement of information and resources from one channel to another;

enabling live, immediate Customer/Account Holder service contact via a mechanism such as text chat and voice-over IP;

providing a mechanism to monitor and track System usage by Customer/Account Holders;

providing a self-service mechanism to Customer/Account Holders;

providing a scaleable platform infrastructure; and providing secured means to protect user sensitive data.

As a further benefit, the System and Method of the invention enables Credit Bureaus to realize immediate file verification Credit Analysis and Requirement Maintenance. Conversely, the BenefitSystem enables Benefit Providers immediate interaction and transaction with Credit Bureaus. As inputs to the BenefitSystem, Credit Bureaus provide Credit Approval, Verification Information, Standard & Requirements, and Address Verification.

Another advantage of the BenefitSystem is that it enables Benefit Providers to immediately provide Optional Coverage, Reporting and Analysis, Premium Distribution, Transaction Logging and Processing and Electronic Enrollment. As inputs to the System, Benefit Providers can offer Products and Services in the form of New Services/Products, Expired Services/Products, Complimentary Services/Products/Partners and Pricing, and such Customer/Account Holder Usage Information as Product Requests, Fulfillment Information, Customer/Account Holder/Product Relationship and Payment Information, e.g., Amount and Terms.

As a further benefit, the System enables Sponsor/Account Providers (i.e., banks, credit card associations, and the like) to provide Customer/Account Holders, Credit Bureaus, and Benefit Providers with Funds Distribution, Management Reporting and Customer/Account Holder Information. In addition, Sponsor/Account Providers can receive Customer/Account Holder Behavior Information such as Usage Statistics and Customer/Account Holder Interest/Needs, Product Inventory and Related Data, Sales Forecasting, Campaign Tracking, Product Requests and Payment Schedules. The BenefitSystem also enables Sponsor/Account Providers to directly validate online terms and conditions for products or benefits thus allowing a quick acceptance and purchase by the Customer/Account Holder. As inputs to the System, Sponsor/Account Providers provide Campaign Offers for Services and Products, such as a Targeting Mechanism and Promotion Mechanism, Campaign Interest-Based Categories, Customer/Account Holder Service Information Link and Services and Product Information.

As another benefit, the System enables Customer/Account Holders (e.g., a cardholder) to access targeted and personalized product offers, specific purchase information, customized account features and benefits, automatic links to fulfillment information (e.g., product information can be printed from a Customer/Account Holder's home computer), and stored mechanisms to maintain Customer/Account Holder interest, history and needs. As inputs to the System, Customer/Account Holders provide Demographics and Interests, Purchase Behavior/Usage Information, Product Requests and Terms & Conditions Approval.

With the BenefitSystem, Marketers are enabled to test various and multiple product offers, communication strategies, upsell, cross-sell and retention strategies with immediate feedback and reporting.

A further feature for use with the System is a one-step, Same-Screen Benefits Management (S-SBM) configuration that facilitates the cooperation between a Customer/Account Holder and a Customer/Account Holder Service Representative at a Service Center in viewing and managing Customer/Account Holder benefits within one screen, without the need to access or load other web-based screens, thus providing the users a faster, simpler and more intuitive user experience.

DETAILED DESCRIPTION OF A PREFERRED EMBODIMENT

In accordance with the present invention a System and Method are provided that enable banks and other financial institutions and associations, as well as commercial entities, i.e., Sponsor/Account Providers, to achieve the promotion and customizing of benefits offered and provided to financial customers, i.e., Customer/Account Holders, that use alternative payment systems and vehicles, e.g., credit cards, and particularly to interact with such alternative payment users and gather information with their permission, and assistance if needed, to tailor the marketing of products and the offering of benefits to those Customer/Account Holders. By means of the present BenefitSystem invention, Customer/Account Holders are able to choose the benefits they receive and Sponsor/Account Providers can promote products based upon Customer/Account Holder interest, need, and financial status, as well as Sponsor/Account Providers' profit potential and brand considerations. Accordingly, information is gathered, with Customer/Account Holder permission, regarding the marketing practices and cross-selling and up-selling mechanisms practiced by the Customer/Account Holder based on the Holder's purchasing pattern, behavior and interests. With this information, product and service selections may then be provided for the consideration of the Customer/Account Holder using specific rules that generate free upgrades, fee-based offers, and other cross-sell/up-sell promotions dependent upon the Customer/Account Holder's interests, and which afford product profit opportunity and other predetermined factors of interest to the Sponsor/Account Providers. The BenefitSystem, by means of a suitable server and software, can provide a knowledge base of Customer/Account Holders tied in directly to both an automated and a live on-line Customer/Account Holder service, and affords management tools for reporting, measuring, and evaluating suggestions to a Customer/Account Holder's complete portfolio. In addition, with a BenefitSystem and Method, payment account Sponsor/Account Providers can control the information and promotional content provided to a Customer/Account Holder creating for the Customer/Account Holder a unique exchange between the Sponsor/Account Provider and the Customer/Account Holder.

Figure 1:
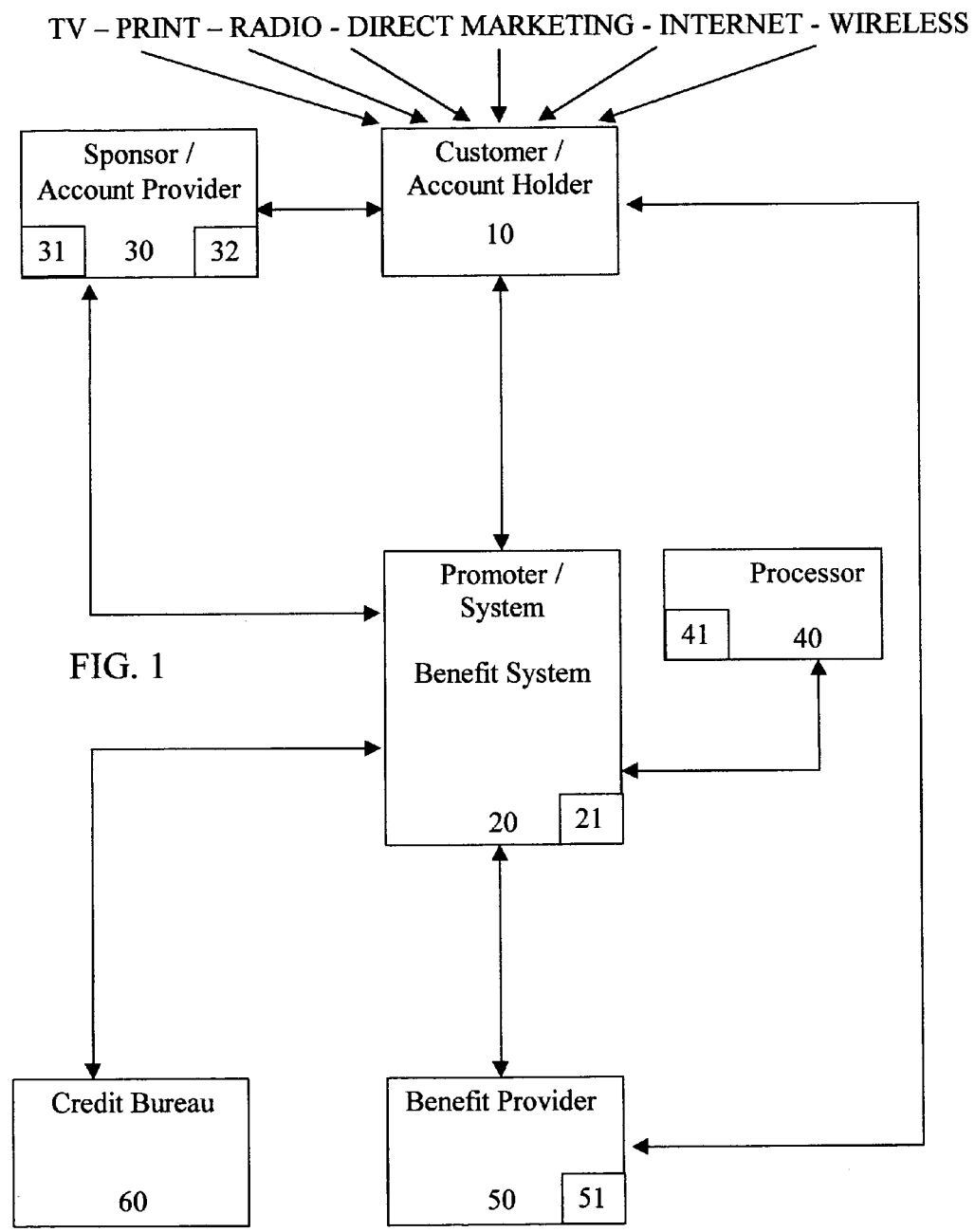
FIG. 1 is a block diagram generally illustrating a System in accordance with the present invention showing a set of typical participants, i.e., a Customer/Account Holder, a Promoter/System, a Sponsor/Account Provider, a Benefit Provider, and a Credit Bureau, and their related interactions.

By way of an example of a specific embodiment, FIG. 1 shows a set of typical participants and the particular preferred steps or interactions involved in performing the Method and using the BenefitSystem of the invention. As seen in FIG. 1, a preferred configuration for supporting the interactions among the various typical participants in the System is formed or assembled by a promoter utilizing a computer-assisted network centered on a suitable server or combination of components selectably accessible to the various participants based on their functions and needs. In particular, the promoter, represented by Promoter/System 20, when forming the BenefitSystem, sets up a Processor 40, including a server and software, for implementing a database, a system of databases, or a like facility, 41, that stores and handles the information required for carrying out the interactions and transactions of the System, and also provides a protective interface 21 between the server 40 and the other participants to suitably control access to the information. Thus, typically, the Promoter/System 20 functions to offer a mechanism to facilitate the creation and implementation of promotional programs for utilization by the other participants.

A Sponsor/Account Provider 30, such as a financial institution or alternative payment system operator, may contact or be contacted by the Promoter/System 20 in order to set up a sales or benefit promotion for its Customer/Account Holders 10. A Benefit Provider 50 is involved by approaching or being approached by the Sponsor/Account Provider 30 or the Promoter/System 20 to supply the subject matter of the promotion, such as insurance benefits, travel mileage, or manufactured products. A Credit Bureau 60 may be brought in to check the credit of a prospective Customer/Account Holder 10 seeking a fee-required benefit or to set up a credit profile that can readily be used to select appropriate Customer/Account Holders for specialized promotions, for example, based on their financial status.

To begin utilization of the BenefitSystem, i.e., perform a first step in utilizing the Method, a Customer/Account Holder 10 may be contacted and informed regarding a promotion offered by a Sponsor/Account Provider 30 by means of the various available media, such as TV, Print, Radio, Direct Marketing, Internet, and Wireless. If a Customer/Account Holder 10 is interested in and wants to follow up on a particular promotion, he will typically initiate an interaction with the Sponsor/Account Provider 30 that he has a relationship with through a credit card or other account, but may also interact with the Promoter/System 20 if appropriate. Once the interaction is initiated by the Customer/Account Holder 10 various inputs and outputs may be exchanged among the various participants using the Promoter/System 20 and the Processor 40 as the essential resource. For example, the Customer/Account holder 10 and the Sponsor/Account Provider 30 can exchange information between each other and with the other participants interacting with the Promoter/System 20, which operates to store and manipulate the information using the Processor 40 servers and software, to achieve the following results:

a Customer/Account Holder 10 can provide an input to communicate with, inform, react to benefits, purchase benefits, request benefits, and indicate interests relative to the Holder's experience with a particular Sponsor/Account Provider 30;

a Customer/Account Holder 10 can provide an input electronically or through traditional means, such as through a Customer/Account Holder Service Call Center 31 of a Sponsor/Account Provider 30, or direct mail response vehicles, to indicate preferences for the means of contacting the Customer/Account Holder and permitting the Sponsor/Account Provider 30 to use Customer/Account Holder demographics, such as name and address, and personal and professional interests;

a Customer/Account Holder 10 can interact with a particular Sponsor/Account Provider 30 to review, manage and purchase benefits relative to the Holder's needs and experiences;

a Customer/Account Holder 10 can provide an input to request specific benefits relative to the Holder's needs and experiences with a particular Sponsor/Account Provider 30;

a Customer/Account Holder 10 can provide inputs to a Sponsor/Account Provider 30 and a Benefit Provider 50 with electronic signatures for product and service terms and conditions that the Customer/Account Holder 10 selects either through purchase or through no-cost provided by the Sponsor/Account Provider 30;

a Customer/Account Holder 10 can interact with a particular Sponsor/Account Provider 30 and establish a relationship with that particular Sponsor/Account Provider;

a Customer/Account Holder 10 can purchase products and services electronically or through traditional methods, such as through a Customer/Account Holder Service Call Center 31, offered as Customer/Account Holder benefits, from a Sponsor/Account Provider 30;

a Customer/Account Holder 10 can interact with a particular Sponsor/Account Provider 30 to review product and service information relative to benefits associated with their relationship;

a Customer/Account Holder 10 can interact with particular Sponsor/Account Providers 30 to receive electronic fulfillment and confirmation of purchases relative to benefits provided either at no cost or on a fee basis from those particular Sponsor/Account Providers 30;

a Customer/Account Holder 10 can interact with the System and particular Sponsor/Account Providers 30 to receive product and service offers and information personalized and relative to the Customer/Account Holders' stated interests and needs; and Sponsor/Account Providers 30 can provide inputs to develop real-time, one-to-one relationships with Customer/Account Holders 10 and provide benefits to Customer/Account Holders in a targeted manner not available with current platforms and in a manner more economical than with platforms presently offered or available to Sponsor/Account Providers 30;

Sponsor/Account Providers 30 can use information about Customer/Account Holders 10 stored in the System with the Holders' permission as a tool and mechanism for specifically targeting Customer/Account Holders 10 uniquely with product and service benefits;

Sponsor/Account Providers 30 can create marketing campaigns based upon Customer/Account Holders' specific, stated permission, which campaigns can be delivered in the medium desired and requested by the Customer/Account Holders 10, such as by, but not limited to, email, direct mail, and web site personalization;

Sponsor/Account Providers 30 can integrate their current Customer/Account Holder informational database 32 with the permission-based database 41 in the Processor 40 provided by the Promoter/System 20;

Sponsor/Account Providers 30 can provide Customer/Account Holders 10 with benefit product information and resources necessary to communicate with Customer/Account Holders on a real-time basis;

Sponsor/Account Providers 30 can link their own Customer/Account Holder Call Service Centers 31 with the Promoter/System 20 and Processor 40 to provide a one-stop shop for Customer/Account Holders 10 to manage all relationships and relationship issues;

Sponsor/Account Providers 30 can request specific products and services from Benefit Providers 50, through the Promoter/System 20, automatically and online;

Sponsor/Account Providers 30 can contact Credit Bureaus 60 through the Promoter/System 20, with Customer/Account Holders' requests for products and/or services which require approval from a Credit Bureau 60 prior to receipt of a product and/or service;

Sponsor/Account Providers 30 can use the System to remotely create, develop, manage and analyze target marketing campaigns;

Sponsor/Account Providers 30 can, through the System, receive, manage, review, analyze and capitalize immediately and directly upon information from Benefit Providers 50, Credit Bureaus 60 and Customer/Account Holders 10 across several relationships delivered to and within the BenefitSystem formed by the Promoter/System 20;

Sponsor/Account Providers 30 can interact with the System to study, analyze and utilize Customer/Account Holders' behavioral patterns, interests, and needs;

Sponsor/Account Providers 30 can use the System to receive Benefit Provider product and service inventory information electronically and remotely;

Sponsor/Account Providers 30 can use the System to receive product and sales forecasting information in a real-time manner;

Sponsor/Account Providers 30 can use the System to track real-time Customer/Account Holders' activity via web interaction with the ability to respond immediately to Customer/Account Holders' needs;

Sponsor/Account Providers 30 can receive automatic and just-in-time inventory of Benefit Provider product and service transactions; and Benefit Providers 50 can exchange information with the other participants through the Promoter/System 20 to achieve the following results:

Benefit Providers 50 can communicate with Sponsor/Account Providers 30 and manage, promote, and advertise their products and services via electronic and traditional mechanisms in a personal and direct manner, immediately to Sponsor/Account Providers 30;

Benefit Providers 50 can promote new services and products and in a direct manner to the buyers, i.e, Sponsor/Account Providers 30;

Benefit Providers 50 can notify current Customer/Account Holders 10 and Sponsor/Account Providers 30 of expired and soon-to-be expired products and services;

Benefit Providers 50 can upsell products and services and promote real-time and per-Customer/Account Holder specification products and services that complement the current products and/or services offered by the Sponsor/Account Providers 30;

Benefit Providers 50 can manage, display, and communicate product and service wholesale and retail pricing specifically and uniquely per each Customer/Account Holder 10 or Sponsor/Account Provider 30, and do it electronically;

Benefit Providers 50 can communicate to Sponsor/Account Providers 30 usage information such as Customer/Account Holders' responses to products, inquiries about products, and information from calls to Benefit Provider connected Customer/Account Holder Service Call Centers 31;

Benefit Providers 50 can communicate changes, directly and cost-effectively, to products or services including but not limited to product descriptions, pricing, and terms and conditions;

Benefit Providers 50 can obtain, manage, study, review, analyze, and utilize immediately information from Sponsor/Account Providers 30 and Customer/Account Holders 10 across several relationships delivered to and within the BenefitSystem;

Benefit Providers 50 can electronically and immediately receive, manage, and fulfill product and service requests from Sponsor/Account Providers 30;

Benefit Providers 50 can immediately and electronically receive Customer/Account Holder approval for terms and conditions relative to any purchased product or service;

Benefit Providers 50 can receive immediate Customer/Account Holder or Sponsor/Account Provider requests for new products and new services;

Benefit Providers 50 can obtain immediate, real-time, Customer/Account Holder or Sponsor/Account Provider product and service payment information such as the amount of the product purchased, terms of purchase, etc.;

Benefit Providers 50 can receive Customer/Account Holder verification information as permitted by Sponsor/Account Providers 30 and governmental information exchange regulations, such as name, address, and telephone number; and Benefit Providers 50 can obtain immediately, through queries and reports, Customer/Account Holder 10 or Sponsor/Account Provider 30 product purchase and usage statistics.

Credit Bureaus 60 can exchange information with the other participants through the Promoter/System 20 to achieve the following results:

Credit Bureaus 60 can improve the time that Sponsor/Account Providers 30 and Benefit Providers 50 have to respond to Credit Bureau inquiries, requests, and approvals or non-approvals;

Credit Bureaus 60 can immediately and electronically provide, verify, and approve requests from Sponsor/Account Providers 30 and Benefit Providers 50 regarding products and services that require Credit Bureau approval;

Credit Bureaus 60 can immediately and electronically provide, update, and manage product, service and credit Standards and Requirements in an electronic mode;

Credit Bureaus 60 can receive requests for approval from Sponsor/Account Providers 30 and Benefit Providers 50; and Credit Bureaus 60 can reduce the current processing time for receiving credit reviews from Sponsor/Account Providers 30 and Benefit Providers 50.

Figure 2:
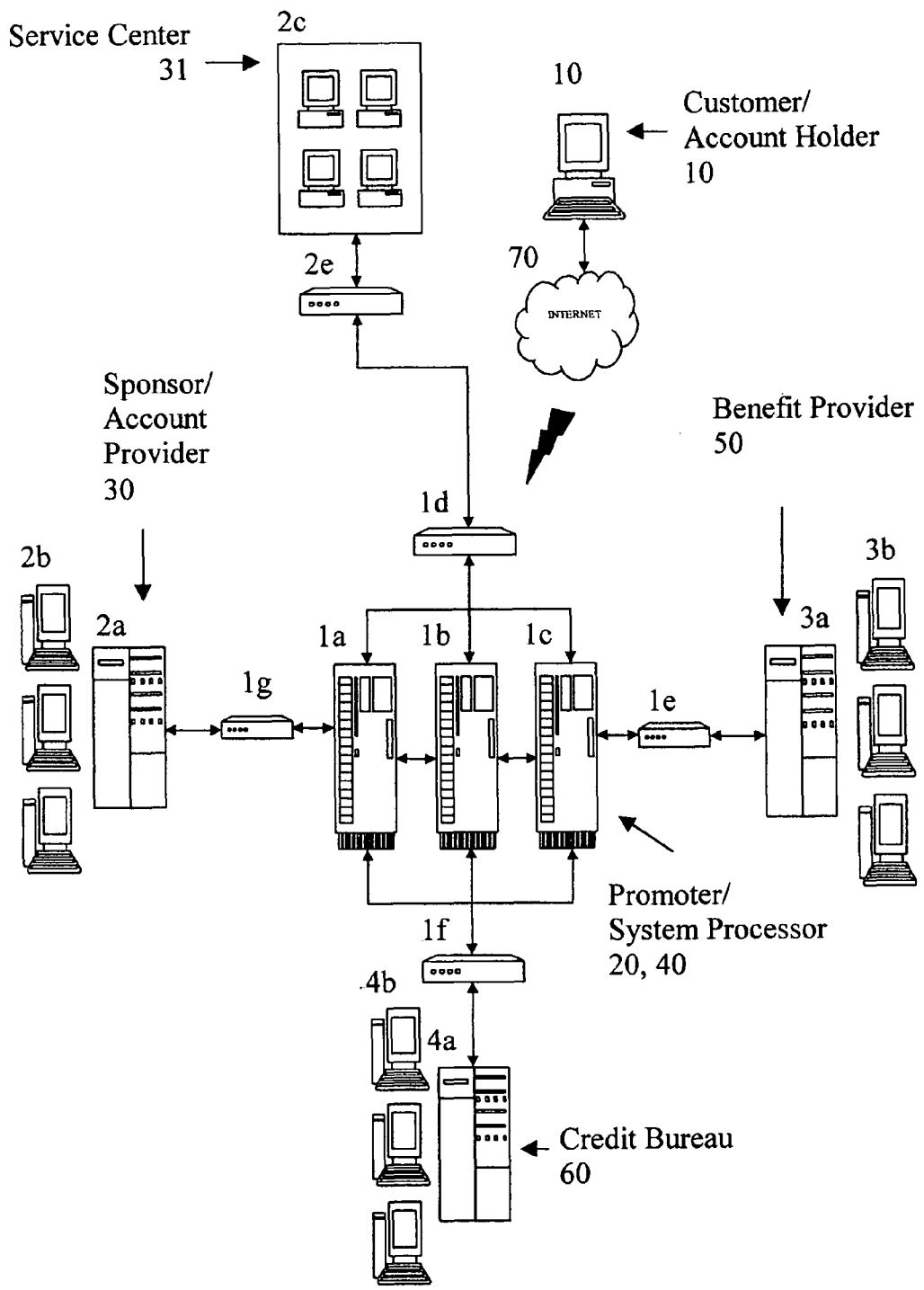
FIG. 2 is a schematic diagram illustrating a System with the participants as in FIG. 1 showing various hardware components and connections, that may be used by the participants, and their related interactions.

Beyond the block diagram of the specific embodiment shown in FIG. 1, FIG. 2 shows an exemplary configuration of BenefitSystem hardware components for supporting the interactions of the various participants in or constituents of the System. The System may be implemented using a computer-assisted network centered on a suitable Promoter/System Processor Server 40 or suitable related combination of server components (1a, 1b, 1c) accessible to the various participants based on their functions and needs. As seen in FIG. 2, participants or members of a promotion or Enterprise, such as a Sponsor/Account Provider 30 (2a, 2b), a Benefit Provider 50 (3a, 3b), and a Credit Bureau 60 (4a, 4b), are connected to the Server 40 or servers (1a, 1b, 1c) through suitable firewalls and other intrusion detection and prevention devices (1d, 1e, 1f, 1g). To begin a process, a Customer/Account Holder 10 may directly, or through a Customer/Account Holder Service Center 31 (2c) provided by a Sponsor/Account Provider 30 (2a, 2b), contact the System after receiving notification of a benefit promotion via various available media, such as TV, Print, Radio, Direct Marketing, Internet, and Wireless (FIG. 1). As the System preferably runs in an Application Server Provider (ASP) format, it is protected via the several suitable firewalls (1d, 1e, 1f, 1g).

Figure 3:
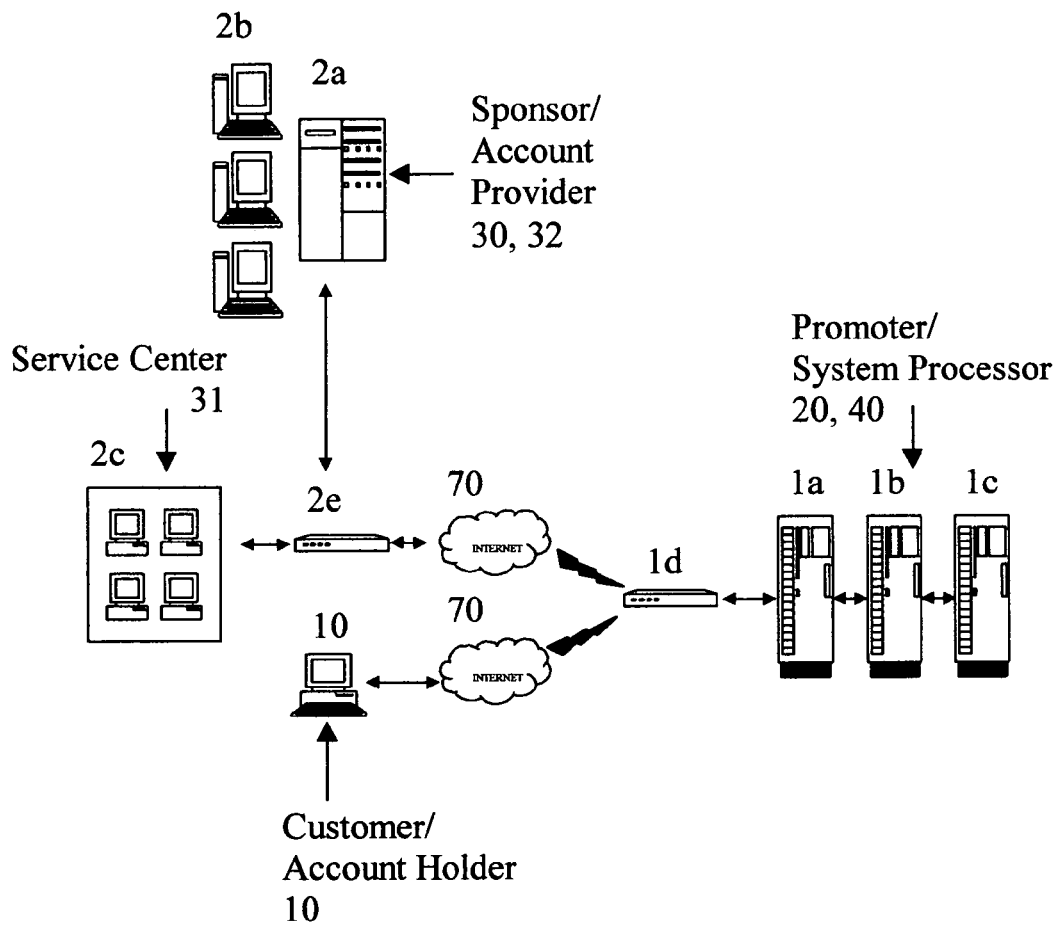
FIG. 3 is a schematic diagram specifically illustrating a hardware arrangement using the Internet for the interactions among a Customer/Account Holder, a Sponsor/Account Provider, a Sponsor/Account Provider's Customer/Account Holder service center, and a Promoter/System's server, including security firewalls, of one embodiment according to the invention.

A Sponsor/Account Provider 30 (2a, 2b) can utilize the System to manage, enhance, and develop targeted relationships with a Customer/Account Holder 10 by interacting with the Promoter/System 20, such as from the Sponsor/Account Provider's own computer-assisted system and technology through the Internet 70 (as shown in FIG. 3). Specifically, the Sponsor/Account Provider 30 (2a, 2b) may contact the Promoter/System 20 to create a targeted campaign intended to provide products, offers and incentives for its Customer/Account Holders 10. In accessing the Promoter/System 20 through a specific set of login requirements and processes, the Sponsor/Account Provider 30 can create targeted offers, create messages and select specific Customer/Account Holder attributes toward determining which Customer/Account Holders 10 should receive which offers. The Sponsor/Account Provider 30 can also determine which Products to select directly from the Promoter/System 20 as the Processor 40 may house such data in database 41, and in the case of data not specifically housed by the Processor 40, the Promoter/System 20 can provide a direct link to a Benefit Provider 50 (3*a*, 3*b*) for access by the Sponsor/Account Provider 30. The Sponsor/Account Provider 30 (2*a*, 2*b*) then makes a Product available to the Customer/Account Holder 10 through its own Customer/Account Holder mechanism, such as Service Center 31 (2*c*).

Customer/Account Holders 10 may access the Promoter/System 20 on the basis of personal preference either directly through the Internet 70, provided the Customer/Account Holder 10 has the required and necessary personal login information, or through the Sponsor/Account Provider's Customer/Account Holder Service Center 31 (2*c*) or Direct Mail Fulfillment house.

The Sponsor/Account Provider's Customer/Account Holder Service Center 31 (2*c*) can access, through a firewall 2*e*, both its proprietary computer-assisted information resource 32 and, further through the Internet or leased line 70 and firewall 1*d*, the Processor 40, depending upon the requirements of the Customer/Account Holder 10 and depending upon the customization needs of the Sponsor/Account Provider 30 (as seen in FIG. 3). However, the Sponsor/Account Provider's Customer/Account Holder Service Center 31 (2*c*) does not have the capability of interacting independently with the Processor 40 so that the Sponsor/Account Provider's Customer/Account Holder Service Center database 32 and information remains proprietary to the Sponsor/Account Provider 30. The database 41 of the Processor 40 can only be accessed by a Sponsor/Account Provider 30, and its Customer/Account Holder Service Center 31, through interface 21 so that databases 41 and 32 are not shared. The Promoter/System 20 can control all of the interactions among the various participants through control of the interface 21.

Figure 4:
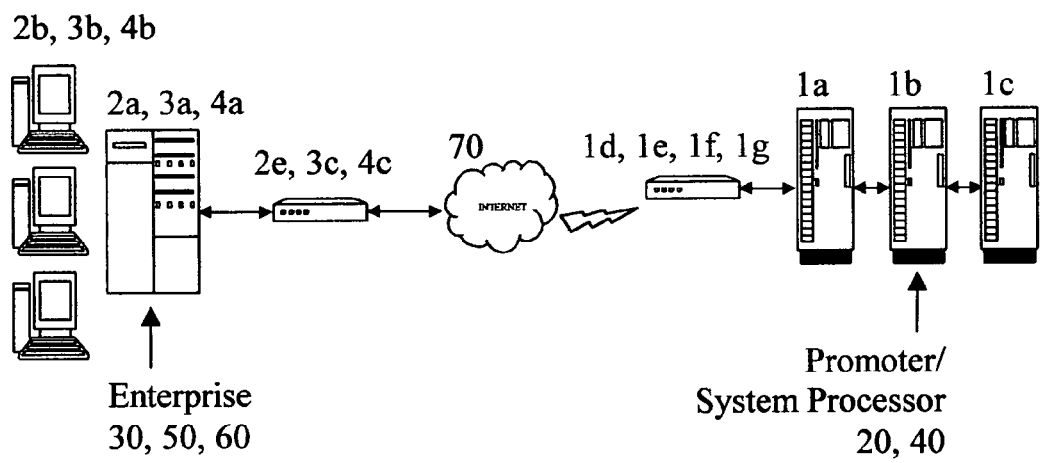
FIG. 4 is a schematic diagram specifically illustrating the interactions over the Internet between an Enterprise, including a Sponsor/Account Provider, a Customer/Account Holder service center, a Benefit Provider, and a Credit Bureau, and the Promoter/System's server in another embodiment in accordance with the invention.

All of the activities performed by the Sponsor/Account Provider 30 (2*a*, 2*b*), Benefit Provider 50 (3*a*, 3*b*), Credit Bureau 60 (4*a*, 4*b*), and Customer/Account Holder 10 can occur at any remote location with Internet access (see FIGS. 3 and 4). Normally specific and unique login access information and processes that enable remote access to be possible and secure will sufficiently protect the BenefitSystem, but further firewalls and similar devices may be added for greater protection.

The BenefitSystem enables the various participants to perform appropriate tasks of interest and of value to them. Using a Sponsor/Account Provider 30 as an initial example, the BenefitSystem enables a Sponsor/Account Provider 30 (2*a*, 2*b*) to perform the following series of tasks:

Sponsor/Account Provider Task 1: Campaign Management

The BenefitSystem and its related target marketing tools enable a Sponsor/Account Provider 30 to create specific offers, products services and features on a one-to-one relationship with a Customer/Account Holder. Offers, promotions, product items and the like can be created specifically for an individual Customer/Account Holder 10. The Sponsor/Account Provider 30 interacts within the BenefitSystem with a Benefit Provider 50 to determine the products to select and the Customer/Account Holder attributes to select. A campaign can include: the target offer, creating a target audience or list (to be used in any direct marketing application from direct mail to email), establishing tracking mechanisms to track the campaign, results analysis and message distribution.

Sponsor/Account Provider Task 2: Information & Analysis

A Sponsor/Account Provider 30 can access the BenefitSystem to review Customer/Account Holder requests (e.g., product requests, address changes), to review Customer/Account Holder performance and behavior, to review Benefit Provider product information and to review Credit Bureau responses to inquiries.

Sponsor/Account Provider Task 3: Interest-Based Marketing and Advertising

A Sponsor/Account Provider 30 can review Customer/Account Holder interest and, in turn, use this information for specific product requests from Benefit Providers 50, or can use the BenefitSystem to present advertising and additional marketing services to the Customer/Account Holder 10.

Sponsor/Account Provider Task 4: Operational and Business Strategic Planning

A Sponsor/Account Provider 30 can access the BenefitSystem for data otherwise currently unattainable to create appropriate Customer/Account Holder relationship strategies, business development and operations planning and product development strategies.

The BenefitSystem enables a Customer/Account Holder 10 to perform the following series of tasks:

A Customer/Account Holder 10 may access the System via the Internet 70 or via the Sponsor/Account Provider's Customer/Account Holder Service Call Center 31, or the Sponsor/Account Providers Direct Mail Direct Response System, using specific login requirements. If the System successfully identifies the Customer/Account Holder 10, the Customer/Account Holder can perform a series of tasks each of which has interconnectivity and relates specifically to Sponsor/Account Providers 30, Benefit Providers 50, and other necessary Enterprises. The BenefitSystem serves as the hub for the joining of the disparate functional groups and the collecting and storing of the information they will use to interact with each other to carry out the various functions made available by the System.

Customer/Account Holder Task 1: Benefits Management

A Customer/Account Holder 10 can select and de-select (remove) benefits for the Customer/Account Holder's current and registered credit card through the System. The Customer/Account Holder may receive the selected benefits at no cost or at a cost. The Sponsor/Account Provider 30 determines the specific Customer/Account Holder fees for the products. This process is recorded live with the System. The System notifies the Benefit Provider 50 of any changes to the Customer/Account Holder benefits. For instance, should the Customer/Account Holder 10 purchase a benefit, the Benefit Provider 50 is notified. The Benefit Provider 50 provides the required information, such as Welcome Kit fulfillment materials, to the Customer/Account Holder 10 and, depending upon the nature of the product, directly charges the Customer/Account Holder's credit card account. The Sponsor/Account Provider 30 also receives information regarding the Customer/Account Holder's benefit selection (and deselection) and this information is stored only for the benefit of the Sponsor/Account Provider 30 in the Processor database 41. The Benefit Provider 50 is not provided private information of the Customer/Account Holder 10. Should the product that the Customer/Account Holder selects require verification and proof of specific credit limits, the BenefitSystem, on behalf of the Benefit Provider 50 and the Sponsor/Account Provider 30, communicates via the Internet and other databases the requirement that the Credit Bureau 60 provide specific approval. The Credit Bureau 60 then provides a report to the designated parties, i.e, Sponsor/Account Provider 30 and Benefit Provider 50.

Customer/Account Holder Task 2: Information Management

Depending upon the BenefitSystem features selected by a Sponsor/Account Provider 30, a Customer/Account Holder 10 may have the opportunity to store, record, update and manage personal information such as demographics, physical mailing address, and similar items necessary to communicate via direct mail, phone or email with that Customer/Account Holder. While such personal information may normally be optional for a Customer/Account Holder to provide, still, should a Customer/Account Holder 10 elect to provide this information, the Sponsor/Account Provider 30 and the Credit Bureau 60 (4a, b) are the only enterprises allowed access to the information by the System unless the Sponsor/Account Provider 30 specifically authorizes that other selected Enterprises are allowed to share it.

Customer/Account Holder Task 3: Interests Management

The BenefitSystem provides to Sponsor/Account Providers 30 the ability to ask Customer/Account Holders 10 to optionally provide information specific to the Customer/Account Holders' interest. In particular, a Customer/Account Holder 10 can identify those topics of most interest to him knowing that the Sponsor/Account Provider 30 will use the information provided to, in turn, provide the Customer/Account Holder with information, products, services and items directly related to the selected items of interest.

Customer/Account Holder Task 4: Product Terms and Conditions Management

The System enables a Benefit Provider 50 and a Sponsor/Account Provider 30 to simultaneously alert and notify a Customer/Account Holder 10 of specific product terms, conditions, warranties and exceptions, which information is presently most commonly delivered via direct mail, posing latency problems for Benefit Providers 50 and Sponsor/Account Providers 30. The Customer/Account Holder 10 can immediately study and review all such product term, condition, and like information directly through and using the BenefitSystem.

A Benefit Provider 50 (3a, 3b) may connect to the BenefitSystem via specific login requirements and processes. Once connected to the System, the Benefit Provider 50 can perform a series of tasks specifically related to the providing of products and services for Sponsor/Account Providers 30. In addition, the System provides opportunities for the Benefit Provider 50 to query the System for analysis and measurement. The Benefit Provider 50 secures products and services specific to the needs of the System, and/or a Sponsor/Account Provider 30 or Customer/Account Holder 10. The Benefit Provider 50 also provides and manages any fulfillment requirements related to the products and services sold. Such fulfillment requirements can be managed automatically by the System should the Benefit Provider request such product specification. Fulfillment examples include: mailing product and service Welcome Kits and Information Packages and mailing product and service terms and conditions.

Benefit Provider Task 1: Product and Service Update

To participate appropriately and adequately, the Benefit Provider 50 offers products and services to the System by providing information regarding the products and services, which information can be either stored directly on the Server or Processor 40 of the System or stored on the Benefit Provider's own server 51 with the System having an access link to relay pertinent, relevant and approved information to System constituents, e.g., Sponsor/Account Providers, Customer/Account Holders, etc. The Benefit Provider 50 can input changes in the products and services to the servers as product updates which can include: product features, terms and conditions, pricing and availability terms.

Benefit Provider Task 2: Analysis and Review

The System stores information in the servers or Processor 40 that allows Benefit Providers 50 to review usage, purchase and related product and service information necessary to manage inventory, product demand and pricing requirements on any and all products offered through the System. Specifically, as Customer/Account Holders 10 interact with the System and either purchase or not purchase products and services offered, and as Sponsor/Account Providers 30 request and do not request products and services, the Benefit Providers 50 through login protected requirements and passwords can access the Processor 40 to obtain the developing information for review and analysis.

A Credit Bureau 60 (4a, 4b) interacts with the System to provide the System constituents, Sponsor/Account Providers 30, Benefit Providers 50, etc., with Customer/Account Holder verification information relevant to particular products and services that require specific Customer/Account Holder credit ratings. This involvement readily facilitates protection of the Benefit Providers 50, Sponsor/Account Providers 30, and other System participants from providing products and services at a fair and competitive rate that may be inconsistent with the potential risk that a particular Customer/Account Holder 10 presents in owning and/or using a product and service. Specifically, a Benefit Provider 50 can indicate specific Customer/Account Holder credit requirements to the database 41 of Processor 40 of the BenefitSystem. The System in turn notifies the Sponsor/Account Providers 30 of the specific Benefit Provider requirements via product information found on the System or in links to the Benefit Provider 50 provided by the System. Then, when a Sponsor/Account Provider 30 receives a request for a specific product or service from a Customer/Account Holder 10, if the product or service is such as to require Customer/Account Holder credit review by the Benefit Provider 50, the System is programmed to automatically communicate the Customer/Account Holder interest in the product to the Benefit Provider 50 and to the Credit Bureau 60. The Credit Bureau 60 reviews the product or service request per the specification of the Benefit Provider 50 and returns either an approval or disapproval to the System where it can then be accessed on the System, by the Benefit Provider 50, the Sponsor/Account Provider 30 and the Customer/Account Holder 10 depending upon the specific arrangement and System customization established by the Sponsor/Account Provider 30 and Benefit Provider 50.

Credit Bureau Task 1: Verification and Review

A Credit Bureau 60 interfaces with the System to receive and review Customer/Account Holder credit information from Benefit Providers 50 and/or Sponsor/Account Providers 30.

Credit Bureau Task 2: Reporting

A Credit Bureau, once it has completed the required tasks of a Benefit Provider 50 and/or a Sponsor/Account Provider 30, reports back to the System the Customer/Account Holder credit information necessary to determine the specific product and services for which the Customer/Account Holder 10 is eligible and orders will be accepted.

In addition to the multiple benefits and specific attributes provided to Benefit Providers 50, Sponsor/Account Providers 30, Credit Bureaus 60 and Customer/Account Holders 10, by the BenefitSystem, an improved interface is provided that is unprecedented in its ability to readily deliver all of the information required by Customer/Account Holders 10 and Customer/Account Holder Service Representatives at Service Centers 31 when accessing the Customer/Account Holder-facing screens for the Customer/Account Holder 10 on behalf of the Sponsor/Account Provider 30.

Figure 5:
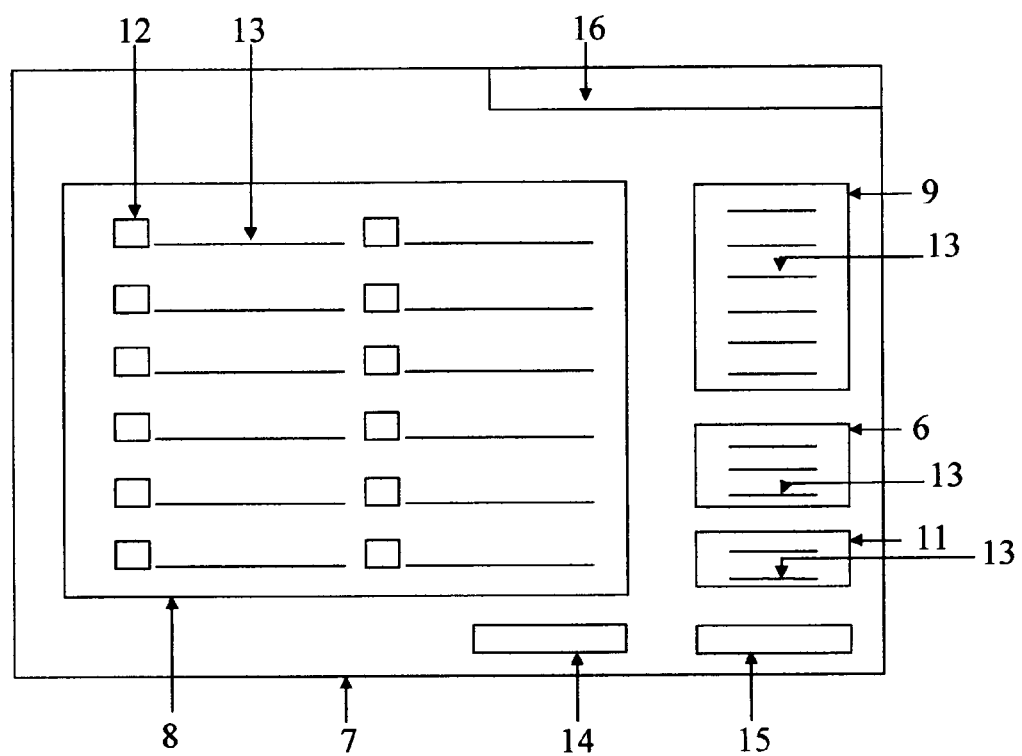
FIG. 5 is a diagram illustrating a System display template, i.e., a Same-Screen Benefits Management (S-SBM) configuration, in accordance with the present invention.

The invention includes a further improvement for use with the BenefitSystem in the form of a same-screen management feature applicable to the monitors and displays interfacing with the System. FIG. 5 represents the System's one-step, Same-Screen Benefits Management (S-SBM) configuration that facilitates a Customer/Account Holder 10 and a Customer/Account Holder Service Representative at a Service Center 31 in viewing and managing Customer/Account Holder benefits by presenting the same one working display screen to both, without the need to access or load other web-based screens, thus providing the users a faster, simpler and more intuitive user experience. In the current Internet environment, companies typically use multiple screen creations to enable Customer/Account Holders to transact business with them. With the System Same-Screen Interface of the invention, Customer/Account Holders 10 can review, select, and order the Sponsor/Account Provider benefits within one computer screen view.

The S-SBM process may be supported using, for example, XML technology that directly links to the BenefitSystem database and proprietary server connectivity. The technology is such that no latency is experienced by the Customer/Account Holder 10 or Customer/Account Holder Service Representative during use.

The Same-Screen Management System is also designed to be of benefit to the Sponsor/Account Provider 30 by providing a template that is easily branded, designed and modified to resemble the Sponsor/Account Providers marketing materials. The template can be made to actually emulate and completely resemble the Sponsor/Account Provider's transaction forms; and the Sponsor/Account Provider can modify the template to its specific needs. Particularly, the design format of the template enables the Sponsor/Account Provider to private-label and privatize or brand its own company to the actual System providing the Customer/Account Holder with a sense that the System is owned and operated by the Sponsor/Account Provider irrespective of the involvement of the Promoter/System 20 and the other participants.

Figure 6:
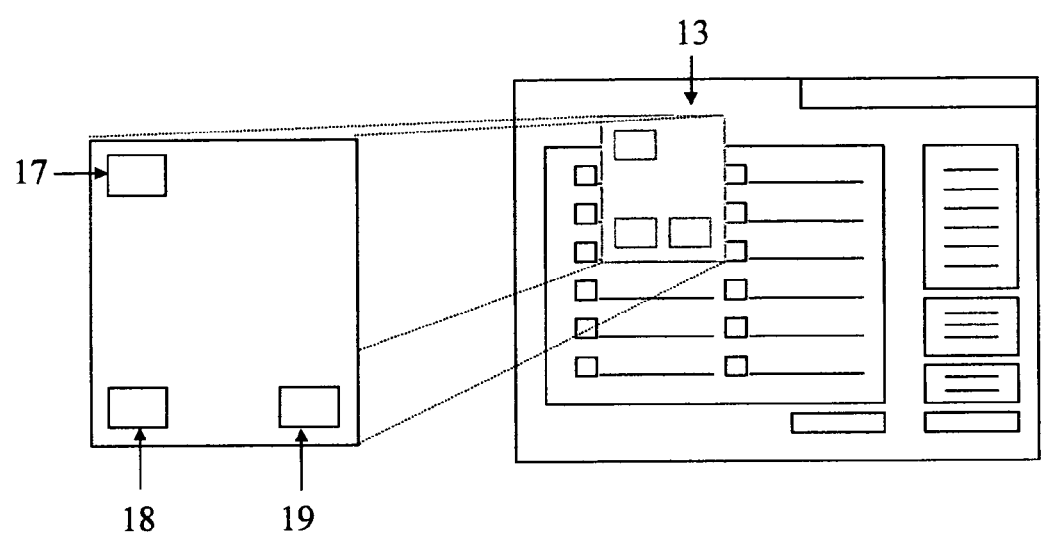
FIG. 6 is a diagram illustrating a specific portion of the System display template shown in FIG. 5.

As seen in FIG. 5, the template used by the Same-Screen Management System, specifically includes:

a Same-Screen Management Page 7 for viewing on a monitor;

a Benefits Display section 8, that frames and presents the benefits that a Customer/Account Holder currently has available for selection/deselection arranged in columns of line entries;

a Current Core section 9, from the Sponsor/Account Provider 30, for listing those benefits that are core to a Customer/Account Holder's relationship with the Sponsor/Account Provider, and that may be modified to tailor it to be unique to the specific Customer/Account Holder 10;

a Current Benefits Selected at No Cost section 6, for listing those benefits that a Customer/Account Holder 10 intends to select from a Benefit Provider 50 at no cost, and which may be made to appear only if the Customer/Account Holder selects or has selected, during a previous session, a benefit or benefits at no cost;

a Current Fee-based Benefits section 11, for displaying those items the Customer/Account Holder 10 intends to purchase at a specified fee, and which can be made to appear only if a Customer/Account Holder selects or has selected, during a previous session, a benefit or benefits at a pre-defined cost;

a Benefit Selection Box 12, within the Benefits Display section 8, that operates as the place where a Customer/Account Holder 10 can indicate a preference for a particular item, and, since the System allows for no-cost and fee-based items to be selected, the Selection Box 12 may contain a specific icon within it to indicate the type of selection the Customer/Account Holder makes, which icon may take various forms, such as a) if the product selected is at no cost, a check mark may appear in the box, b) if, instead, the product selected is a fee-based product, the box may contain a dollar sign, and c) if the available product is not selected, the box may remain empty;

a Product Description Pop-Up Window feature 13, that enables the user to read specific information regarding a displayed product while on the Same-Screen Management page, whereby the user clicks on the displayed product to cause a small window 13 to appear presenting the product description, and, additionally, three "click-able" buttons 17, 18, and 19 may appear as illustrated in FIG. 6, which buttons may be clicked to respectively display Product Descriptions, Product Terms and Conditions, and Product Warranties and Exclusions;

an Update button 14 which, by being clicked on, enables the Customer/Account Holder or Customer/Account Holder Service Representative to update any selections made within the Benefits Display section 8, and which changes are then reflected in the Current Fee-based Benefits section 11 and in appropriate boxes 12 adjacent the benefits listed in the columns of line entries in the Benefits Display section 8, otherwise, the screen Page 7 does not change, in keeping with an S-SBM benefit;

a Purchase/Save button 15 that enables the Customer/Account Holder or Customer/Account Holder Service Representative to end the selection process and either save the changed benefits or move to a subsequent screen, which subsequent screen is used in the event a Customer/Account Holder has purchase benefits which require a credit card number, or the approval of additional information and/or the approval of a Credit Bureau 60, and, additionally, if the Customer/Account Holder selections require purchase or credit information, the System automatically begins the process once this button 15 is selected; and a URL Indicator section 16, that indicates the URL of the internet location being used that never changes while the Customer/Account Holder or Customer/Account Holder Service Representative interacts with the System.

It will accordingly be seen that the BenefitSystem can uniquely serve two business groups, i.e., Business Marketers and Business End-users. Business End-users include Consumers, e.g., Customer/Account Holders, and Customer/Account Holder Service Representatives, while Business Marketers include Payment Associations, Payment Account Sponsor/Account Providers, Credit Card Providers, Benefit Providers, Credit Bureaus, and Fulfillment Centers. Business Marketers require more efficient and effective means for providing value to Customer/Account Holders in the marketing process. Such companies need better and more targeted communication tools for Customer/Account Holder service groups. Customer/Account Holders, i.e., account holders in the Financial Services market, continually demand a relationship with banks and credit card providers that meet their changing lifestyle, i.e., the needs and interests of the Customer/Account Holder.

In addition to providing direct and immediate benefits applicable to Business Marketers and Business End-Users, the BenefitSystem integrates multiple business processes so as to contribute to bettering support of the Customer/Account Holder. In essence, the System contains elements that complement a company's current Customer/Account Holder Relationship Management (CRM) tool(s) thus providing companies with a simple mechanism to strengthen Customer/Account Holder affinity based upon a user's stated interests and needs.

Business Marketer Tool

The importance of the System tool resides in its ability to leverage business relationships, the products and services (benefits). However, considering that factor by itself would unnecessarily limit the scope and potential of the product. The Business Marketer Tool enables marketers responsible for developing, managing, and enhancing Customer/Account Holder relationships to target Customer/Account Holders with specific benefits in a manner in which they were not before capable. Now, through the use of the System as a Business Marketer Tool, marketers can provide benefits to Customer/Account Holders in a real-time manner, based upon Customer/Account Holder interest, need, or even worth. Business Marketers can use the tool to identify Customer/Account Holders (Targeting Engine), develop campaigns (Program Management), distribute benefits or other benefit-related offers (Distribution) and track and measure results (Results Analysis). The System used as a Business Marketer Tool provides customized offer capabilities currently not available.

Additionally, the BenefitSystem enables the Business Marketer to use the information contained within the System to conduct operational and strategic business planning, especially with regard to updating current benefit products and developing future benefit products based upon Customer/Account Holder usage, behavior, interest, and financial status.

Business End-User Tool

Customer/Account Holders involved in the Financial industry, and in the case of other industries, end-users who receive benefits, require multiple ways in which to contact a Sponsor/Account Provider or an Association to modify a current portfolio of benefits. Such ways include: web-enabled access, e-mail, text chat, instant messaging, shared browsing, voice-over IP and live Customer/Account Holder service. Given the diverse requirements and ways for the Customer/Account Holder to manage benefits, the use of the System as a Business End-User Tool functions in a way similar to traditional web site interactions or Customer/Account Holder service interactions.

The Business End-User Tool allows a Customer/Account Holder to access the web via a secure, encrypted login. Depending upon the specific relationship between the System and the Association or Sponsor/Account Provider, a Customer/Account Holder may access the System database of benefits and manages his or her portfolio. Because the System runs in an Application Service Provider (ASP) format, the Customer/Account Holder does not leave the Sponsor/Account Provider or Association "site" from a design, look and feel perspective. Information is updated based upon Customer/Account Holder input and activity. Such data is linked to the stored information or legacy systems resident at the respective Sponsor/Account Provider or Association. Upon the modification of the benefits portfolio, fulfillment information, i.e., Welcome Kit, insurance forms, etc., is delivered through links to Fulfillment Centers or Systems.

For Customer/Account Holders not interested in using the web to manage benefits, the BenefitSystem allows integration with Customer/Account Holder Service centers by using the same benefits platform and access to the System products (benefits) as is used via the web. The added difference is that the System platform can be integrated with additional CRM support legacy systems resident with the Sponsor/Account Provider or Association.

In summary, in accordance with the present invention a System and Method are provided with features that enable the practicing of all of the following processes.

Personalization Features:

Enables Customer/Account Holders to choose their benefits;

Enables Sponsor/Account Providers to promote products based upon Customer/Account Holder interest and profit potential;

Enables the presentation of offers based on Customer/Account Holder need; and

Enables the promotion of multiple brands and sub-brands.

Business Intelligence Features:

Enables the gathering of information regarding Customer/Account Holders in permission based marketing environment;

Enables the provision of cross-selling and up-selling mechanisms based on the Customer/Account Holder's purchasing pattern and behavior;

Enables the generation of enhancement selections for the Customer/Account Holders via specific rules that generate free upgrades, fee-based offers and other cross-sell/upsell promotions dependent upon Customer/Account Holder interests, product profit opportunity and other pre-determined factors;

Enables the provision of a knowledge base of Customer/Account Holders tied in directly to both automated and live on-line Customer/Account Holder service;

Enables the provision of management tools for reporting and measurement;

Enables the managing and offering of suggestions to a Customer/Account Holder's complete portfolio;

Enables the provision of incentives that generate free upgrades, fee-based offers and other;

Enables various levels of Customer/Account Holder service dependent upon the Customer/Account Holder and his value to the Sponsor/Account Provider; and Enables rapid user data cleansing;

Workflow Features

Enables the routing of Customer/Account Holder-emails and calls to appropriate individuals, e.g., CSR, management personnel; and Enables an automated e-mail response system based on the content of the e-mail.

Infrastructure Features

Enables the integration of different Customer/Account Holder channels including the Internet, e-mail, text chat instant messaging, shared browsing, and voice-over IP, thereby providing transparent movement of information and resources from one channel to another;

Enables live, immediate Customer/Account Holder service contact via a mechanism such as chat and voice-over IP;

Enables the provision of a mechanism to monitor and track system usage;

Enables the provision of a self-service mechanism;

Enables the provision of a scaleable platform infrastructure; and

Enables the provision of a secured means to protect user sensitive data.

The BenefitSystem also enables rapid and seamless interaction among several important and required processes. In fact, unlike other CRM or fulfillment software applications, the BenefitSystem integrates disparate systems and streamlines current, often manual and independent, processes. Specifically, the BenefitSystem:

Enables Credit Bureaus to realize immediate file verification Credit Analysis and Requirement Maintenance, and, conversely, allows Providers immediate interaction and transaction with Credit Bureaus;

Enables Benefit Providers (i.e., benefit providers) to immediately provide Optional Coverage, Reporting and Analysis, Premium Distribution, Transaction Logging and Processing and Electronic Enrollment;

Enables Sponsor/Account Providers (i.e., banks, financial associations, payment account Sponsor/Account Providers, etc.) to provide Customer/Account Holders, Credit Bureaus and Benefit Providers with Funds Distribution, Management Reporting and Customer/Account Holder Information;

Enables Marketers to test various and multiple product offers, communication strategies, upsell, cross-sell and retention strategies with immediate feedback and reporting; and Enables Marketers and other business managers to develop operations and business strategies necessary to support the growth of the company.

Accordingly, then, the System provided by the invention can be utilized by personal payment account providers, i.e., Sponsor/Account Providers, such as financial institutions and merchants, wishing to increase the use of alternative payment methods for purchases by Customer/Account Holders, in cooperation with Promoter/Systems, Processors, and Credit Bureaus. For example, a Promoter/System and/or Processor can offer the system to both card providers and merchants and provide the necessary technology to store relevant information on the Customer/Account Holders, with their permission, and utilize it when creating promotions.

Further, a merchant could provide the System and use it as a powerful means for various promotions in connection with different card provider partners.

Consequently, it will be seen that an improved System and Method have been described that provide an advantageous manner of handling benefit promotions to Customer/Account Holders offering efficiency and targeting that can be used with the Internet and with which merchants can enhance their Customer/Account Holder records and provide sales information and promotions electronically.

It will also be understood by those of skill in the art that a variety of combinations of hardware and software may be used to implement all of the features of the invention and that the ability to select, assemble, and connect the hardware and adapt and write the software for such combinations, will be readily within the purview of the skilled artisan using the foregoing descriptions and suggestions without the need for undue experimentation. An operative system has been implemented but it will be appreciated that its detailed description here would serve no practical purpose by way of enablement as it would be too specialized and extensive to include in this application and the components are constantly being changed and updated during use and adapting to various participants. Also, technological progress in the field would probably render such a particular current embodiment obsolete by the time this application issues.

What is claimed is:

1. A system for promoting and customizing benefits made available to account holders by account provider benefits sponsors making available to each individual account holder benefits that are customized to that individual account holder from among all of the available benefits, for selection and request by said individual account holder, comprising:
    a promoter means that maintains a store of information on account holders, said store of information comprising:
        information on account holders including individual account holder account identifiers respectively associated with each individual account holder and recognizable by an account provider benefits sponsor;
        a plurality of personal information on each individual account holder associated with an account identifier, which personal information is obtained with the individual account holder's permission and comprises information pertinent to the benefits to be made available to customize what benefits are made available to each individual account holder to those most likely to be of interest; and
        information identifying benefits to be made available and benefit providers for supplying said benefits to be made available;
    an account provider benefits sponsor means, maintained by an account provider benefits sponsor, that interacts with:
        said promoter means to exchange at least said pertinent information on account holders with said store maintained by said promoter means, and to receive notification when a requested benefit has been supplied to an account holder by a benefit provider;
        said account holders to respectively inform said account holders of which benefits are made available to each, customized based on the pertinent information respectively associated with said account holders, and to accept requests for available benefits from said account holders using the respective account identifier for each account holder making a request, and for debiting an account holder's account using the respective account holder's account identifier when a requested benefit has been supplied to the account holder;
    a benefit provider means, maintained by a benefit provider, that interacts with:
        said account holders requesting available benefits, to supply the available benefits requested to said account holders; and
        said promoter means to exchange said information identifying benefits to be made available and to provide notification when a requested benefit has been supplied to an account holder; and
    an account holder means, maintained by an account holder, that interacts with:
        said account provider benefits sponsor means to be informed of which benefits are made available for selection by said account holder, and to request available benefits using the respective account identifier for said account holder;
        said promoter means to exchange said pertinent information on said account holder with said store maintained by said promoter means to customize which benefits are made available to said account holder; and
        said benefit provider means to be supplied the available benefits requested.

2. A system as in claim 1, wherein said store of information comprises an internet connected server.

3. A system as in claim 2, wherein said internet connected server comprises a permission-based database and said account provider benefits sponsor means comprises an account holder informational database that interacts with said permission-based database.

4. A system as in claim 2, wherein said benefit provider means comprises a benefits information storing server with an access link to said internet connected server to provide updated benefit information to said internet connected server for access by said account provider benefits sponsor means, and said account holder means.

5. A system as in claim 1, further comprising a credit bureau means that interacts with said promoter means to check the credit of an account holder requesting an available benefit.

6. A system as in claim 5, wherein said store of information comprises an internet connected server comprising a permission-based database with a protective interface that controls access to said permission-based database selectively by said account provider benefits sponsor means, said benefit provider means, said account holder means, and said credit bureau means.

7. A system as in claim 1, wherein said account provider benefits sponsor means comprises an account holder service center for interacting with a plurality of account holder means to inform the respective account holders maintaining said plurality of account holder means regarding which benefits are made available to each, and to accept requests for available benefits from said account holders by their respective account holder means.

8. A system as in claim 1, wherein said promoter means produces said store of information to provide a central database with and through which said account provider benefits sponsor means, said account holder means, and said benefit provider means interact with each other to promote and make available benefits to said account holders maintaining account holder means.

9. A system as in claim 1 wherein said plurality of personal information on each individual account holder obtained with the individual account holder's permission further comprises information pertinent to the relationship between the account holder and the account provider benefits sponsor.

10. A system for customizing benefits made available by financial institutions to their financial customers having accounts therewith, comprising:
means for maintaining a store of information on financial customers including individual customer account identifiers each recognizable by the respective financial institution of the individual financial customer and each having associated therewith a plurality of personal information on the respective individual financial customer, which plurality of personal information is obtained with the respective individual financial customer's permission and comprises information pertinent to the benefits made available;
means for respectively informing said financial customers of which benefits are made available to each, by selecting the benefits made available to a particular financial customer utilizing the personal information respectively associated with said particular financial customer to customize which benefits are made available to said particular financial customer from among all of the available benefits to those most likely to be of interest;
means for accepting requests for available benefits from financial customers using the respective individual customer account identifier for each financial customer making a request;
means for interacting with benefit providers to supply the available benefits requested by said financial customers; and
means for debiting a particular financial customer's account using the respective individual customer account identifier when a requested benefit has been supplied to said particular financial customer.

11. A system as in claim 10 further comprising means for interacting with a customer credit bureau to check the credit of a financial customer requesting an available benefit.

12. A system as in claim 10 wherein said means for maintaining a store of information, said means for accepting requests for available benefits, means for interacting with benefit providers to supply the benefits requested, and means for debiting a financial customer's account are comprised in an internet connected server.

13. A system as in claim 12 wherein said internet connected server further comprises said means for interacting with a customer credit bureau.

14. A system as in claim 10 wherein said means for maintaining a store of information further comprises means for storing and accessing a portion of said plurality of personal information obtained with the respective financial customer's permission that comprises information pertinent to the relationship between the financial customer and the financial institution.

15. A system as in claim 10 further comprising means for enabling interactions between financial institutions and benefits providers.

16. A system for customizing benefits to be made available to financial account holders by their account providers, comprising:
database means for storing:
identification information on financial account holders including individual account holder identifiers respectively relating to each financial account holder and recognizable by said account providers;
a plurality of personal information respectively concerning each financial account holder having a related individual account holder identifier, which personal information is obtained with the respective financial account holder's permission and comprises information pertinent to the benefits to be made available; and
provider information identifying benefit providers for supplying said benefits to be made available;
means for respectively advising said financial account holders of available benefits by selecting the available benefits for each account holder utilizing said plurality of personal information stored in said database means to customize which benefits are made available to each account holder from among all of the available benefits to those most likely to be of interest;
means for accepting requests for available benefits from said financial account holders;
means, utilizing said provider information in said database means, for interacting with benefits providers to supply the benefits requested by said financial account holders; and
means for debiting a financial account holder's account using the respective account holder's account identifier when a requested benefit has been supplied to the account holder.

17. A system as in claim 16 further comprising means for interacting with a credit bureau to check the credit of a financial account holder requesting an available benefit.

18. A system as in claim 16 further comprising a viewing screen template for display on a single viewing screen to customize the requests for available benefits from said financial account holders, said template comprising:
- a same-screen management page for viewing on a single viewing screen by a financial account holder;
- a benefits display section of said management page, for framing and presenting the benefits that a respective financial account holder currently has available for selection, with said benefits being displayed in columns of line entries;
- a current core section of said management page, for listing those benefits that are core to a respective financial account holder's relationship with the account provider, said core section being modifiable to tailor it to be unique to said respective account holder;
- a current benefits selected at no cost section of said management page, for listing those benefits that a respective financial account holder intends to select from a benefit provider at no cost, and which no cost section is modifiable to appear only if the respective financial account holder selects, or has selected during a previous session, a benefit at no cost;
- a current fee-based benefits section of said management page, for displaying the benefits a respective financial account holder intends to purchase at a specified fee, and which fee-based benefits section is modifiable to appear only if the respective financial account holder selects, or has selected during a previous session, a benefit at a pre-defined cost;
- a benefit selection box, within said benefits display section, being modifiable by a respective financial account holder to indicate a preference for a particular benefit by entering a specific icon within said benefit selection box indicative of the type of selection made by the respective financial account holder; and
- a product description pop-up window of said management page, for enabling a respective financial account holder to read specific information regarding a displayed benefit while viewing said management page, said pop-up window appearing as a small window presenting a description of said displayed benefit when the respective financial account holder clicks on the displayed benefit.

19. A system as in claim 16 wherein said plurality of personal information obtained with the respective financial account holder's permission stored in said database means further comprises information pertinent to the relationship between the account holder and the account provider.

20. A system as in claim 16 wherein said database means further comprises means for enabling the account providers to interact with the benefits providers.

21. A database system for customizing benefits to be made available to financial account holders by their account providers, comprising:
- a first part storing information on financial account holders including individual account holder account identifiers recognizable by said account providers and each identifier having associated therewith a plurality of personal information on the respective account holder, obtained with the account holder's permission, which personal information comprises information pertinent to the benefits to be made available;
- a second part storing information identifying benefit providers for supplying said benefits to be made available;
- a third part storing information accessible for selecting available benefits for each account holder customized utilizing said pertinent information accessed from said first part to those benefits most likely to be of interest to each respective account holder and for respectively informing said financial account holders of the available benefits selected for each;
- a fourth part storing information for accepting requests for available benefits from said financial account holders and for interacting with said second part to inform identified benefit providers to supply the benefits requested by said financial account holders; and
- a fifth part storing information accessible for debiting an account holder's account using the respective account holder account identifier when a requested benefit has been supplied to the account holder.

22. A database system as in claim 21 further comprising a sixth part storing information accessible for interacting with a credit bureau to check the credit of a financial account holder requesting an available benefit.

23. A database system as in claim 21 wherein said personal information on financial account holders, obtained with the account holder's permission, further comprises information pertinent to the relationship between said financial account holders and their account providers.

24. A database system as in claim 21 further comprising information for enabling account providers to interact with benefit providers.

25. A method for customizing benefits to be made available to financial account holders by their account providers, comprising the steps of:
storing in a database:
- information on financial account holders including individual account holder account identifiers respectively associated with each individual financial account holder and recognizable by said account providers;
- a plurality of personal information on each individual financial account holder associated with an account identifier, which personal information is obtained with the individual financial account holder's permission and comprises information pertinent to the benefits to be made available; and
- information identifying benefit providers for supplying said benefits to be made available; and respectively informing said individual financial account holders of available benefits by selecting the available benefits to be informed to each individual financial account holder utilizing said plurality of personal information stored in said database to customize which benefits are made available to each individual financial account holder to those most likely to be of interest.

26. A method as in claim 25 further comprising the steps of:
accepting requests for available benefits from said financial account holders;
utilizing said information in said database identifying benefit providers, for interacting with benefit providers to supply the benefits requested by said financial account holders; and
debiting an individual financial account holder's account using the respective individual account holder account identifier when a requested benefit has been supplied to the individual financial account holder.

27. A method as in claim 25 further comprising the step of interacting with a credit bureau to check the credit of a financial account holder requesting an available benefit.

28. A method as in claim 25 wherein said plurality of personal information obtained with the individual financial account holder's permission further comprises information pertinent to the relationship between the account holder and the financial institution.

29. A method as in claim 25 comprising the further step of storing in said database information enabling account providers to interact with benefit providers.

* * * * *